No. 878,064. PATENTED FEB. 4, 1908.
F. HERBERT.
MOLDING MACHINE.
APPLICATION FILED DEC. 20, 1905.

3 SHEETS—SHEET 1.

Witnesses,
Edward T. Wray
Howard L. Kraft

Inventor.
Fred Herbert
by Parker & Carter
Attorneys.

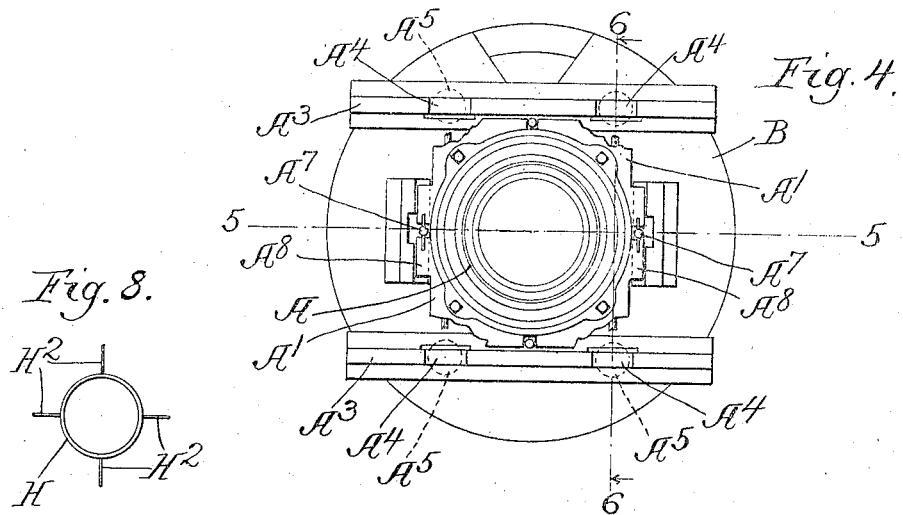
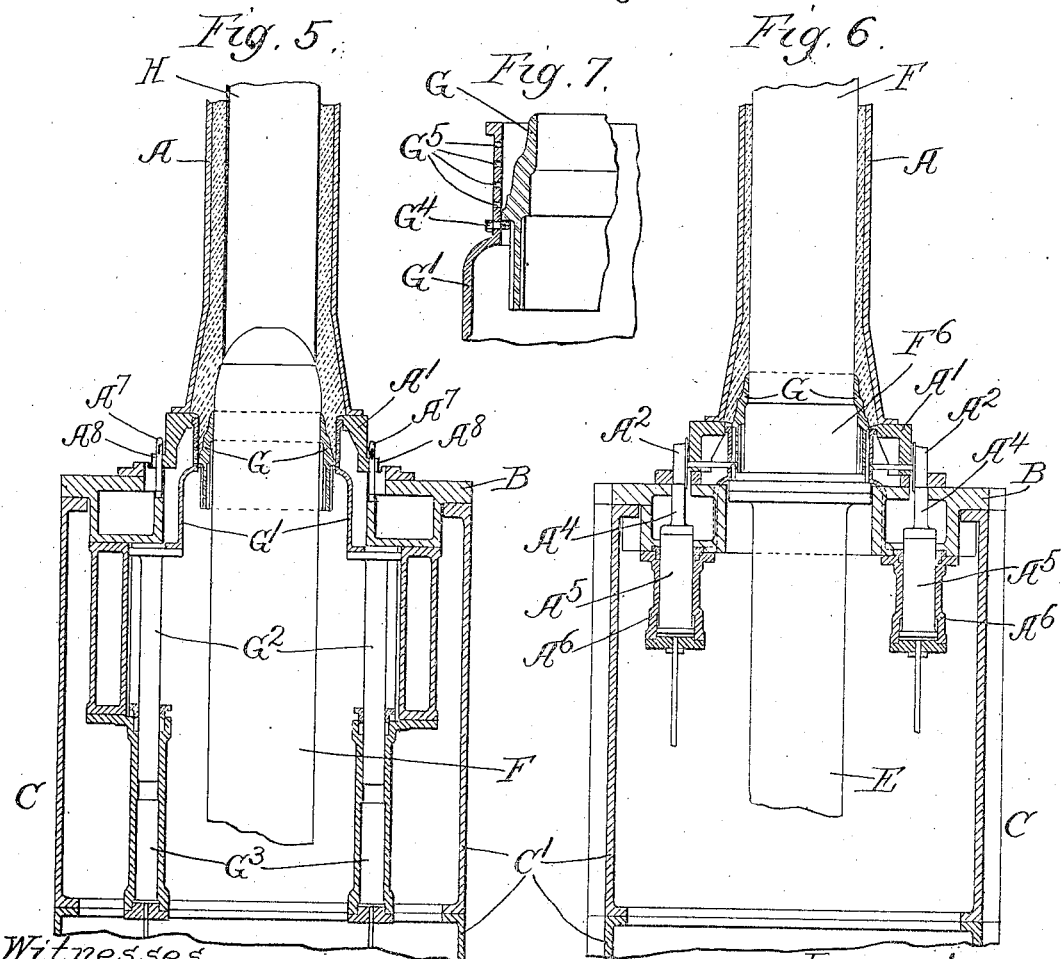

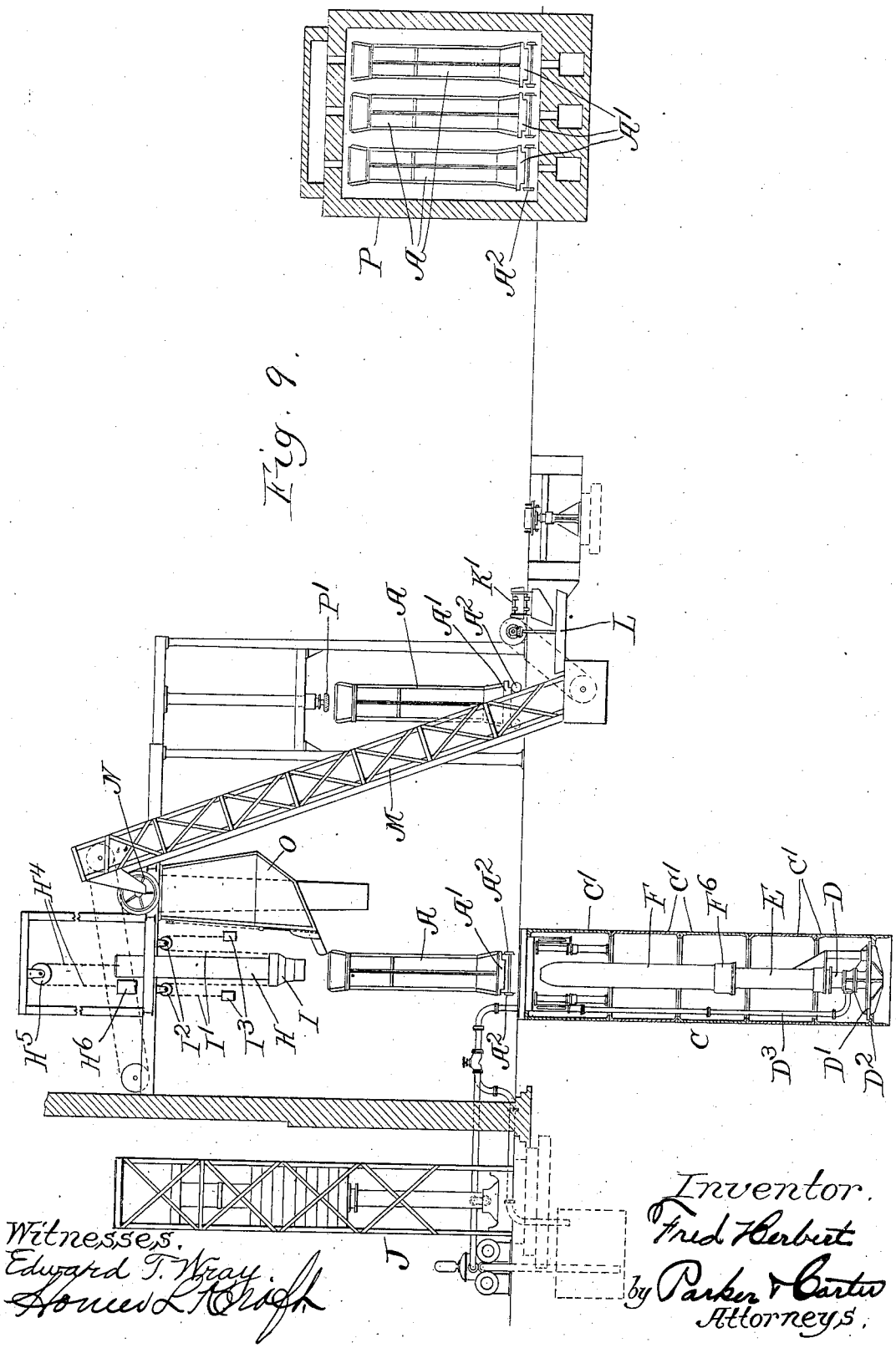

UNITED STATES PATENT OFFICE.

FRED HERBERT, OF BIRTLEY, ENGLAND.

MOLDING-MACHINE.

No. 878,064.     Specification of Letters Patent.     Patented Feb. 4, 1908.

Application filed December 20, 1905. Serial No. 292,549.

*To all whom it may concern:*

Be it known that I, FRED HERBERT, a subject of the King of Great Britain, residing at Birtley, county Durham, England, have invented a certain new and useful Improvement in Molding-Machines, of which the following is a specification.

This invention relates to machines for forming sand molds.

The object of the invention is to provide a machine for forming sand or other molds which is simple in construction and efficient in operation.

A further object is to provide a machine of the character referred to, which is practically continuous in its operation when once started up, and which produces a machine made mold.

A further object is to provide means for forming a mold which is homogeneous throughout, and wherein the sand is compressed to absolutely uniform density throughout the entire length of the mold, and wherein the mold is formed absolutely true.

A further object is to provide means whereby molds of differing sizes or diameters may be readily produced on the same machine.

A further object is to provide a construction and arrangement of mechanism wherein access of sand to the operating or molding parts of the machinery or power mechanism is prevented.

A further object is to provide means for preventing interruption of the operation of the machine through frost or freezing.

A further object is to provide auxiliary patterns for forming the socket and spigot portions of the mold and combining such patterns in coöperative arrangement and location with reference to the other parts of the machine.

A further object of the invention is to provide means for regulating and measuring the quantity of sand required for use in forming the mold, and in coöperative arrangement with reference to other features of the machine.

A further object is to provide means for efficiently supporting and guiding the main pattern so as to insure an absolutely true movement thereof with reference to the flask when advanced to, or retracted from, its work.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Figure 1:
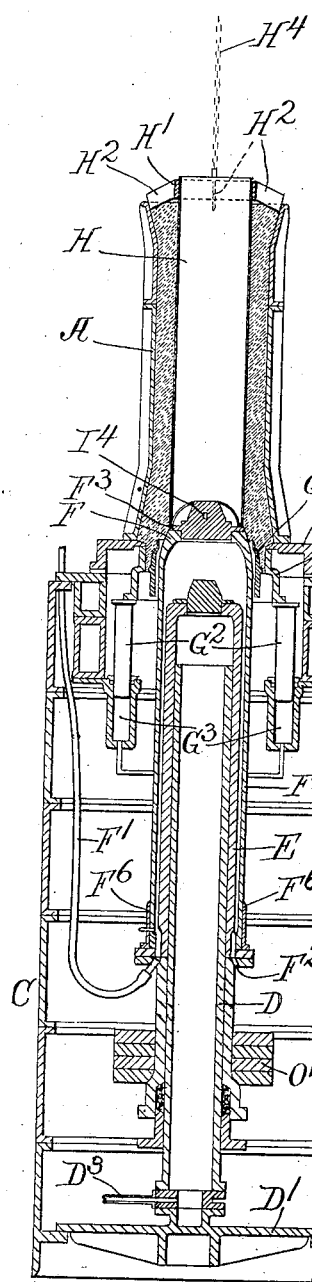
Figure 2:
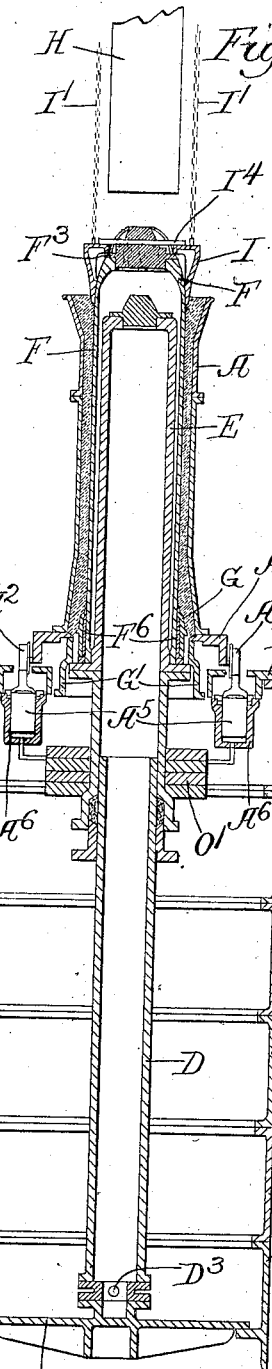
Figure 3:
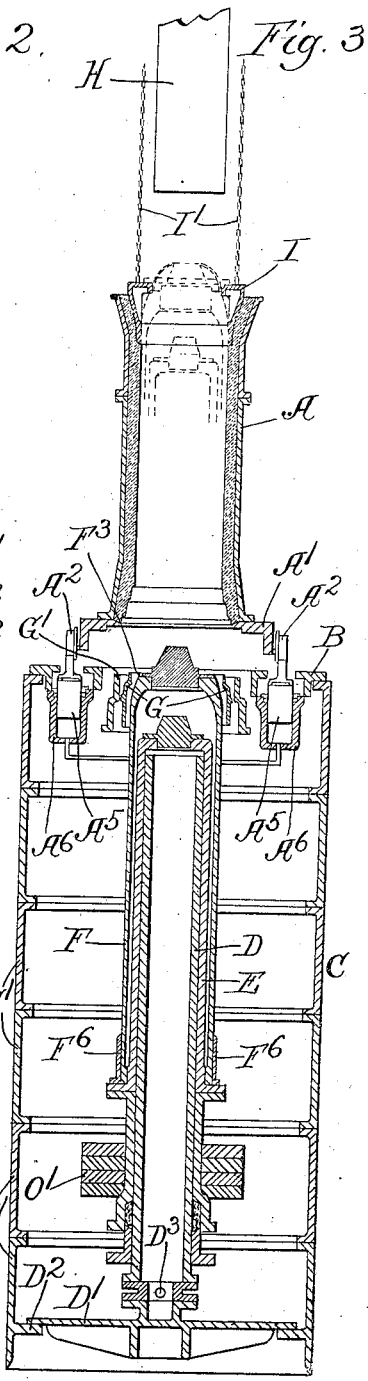

Referring to the accompanying drawings and the various views and reference signs appearing thereon; Figure 1 is a view in longitudinal section of a molding machine constructed in accordance with, and embodying the principles of, my invention, the main pattern having been raised sufficiently far for the ramming head on the upper end thereof to project through the socket pattern, and the displacing or measuring tube being inserted through the flask and resting on the ramming head of the main pattern, the socket pattern being raised to working position and the sand introduced ready to begin the operation of forming the mold. Fig. 2 is a view in longitudinal section showing the main and socket patterns in their extreme advanced positions. Fig. 3 is a similar view showing the mold completed and all the parts except the spigot pattern and gates on same, in withdrawn or initial position, and out of the way ready for the mold and flask to be removed. Fig. 4 is a view in plan showing means for securing the mold flask in position. Fig. 5 is a broken view in section on the line 5, 5, Fig. 4. Fig. 6 is a view similar to Fig. 5, on the line 6, 6, Fig. 4. Fig. 7 is a broken detail view in section, somewhat enlarged, showing the auxiliary socket pattern and means for adjustably supporting the same. Fig. 8 is a detail view in plan of a centering spider for the displacing tube. Fig. 9 is a view in longitudinal section showing means for supporting the displacing tube or measuring tool, and the auxiliary spigot pattern.

The same part is designated by the same reference sign wherever it occurs throughout the several views.

In the operation of forming sand molds for use in casting pipes, and particularly pipes of great length and large size, great difficulty has heretofore been experienced in securing absolutely true molds of uniform density and homogeneity throughout the length thereof, due to the peculiar characteristics of the sand employed when subjected to the operations and manipulations necessary in the production of the molds. It is a common expedient to supply the sand to the flask in which the mold is formed and to ram the sand so supplied by hand. This, however, is not only slow and tedious but also results in inequalities in the density of the mold at various points, which inequalities cause unequal expansion or contraction in the metal of the pipe which, of course, is a serious defect. In machines where power ramming is attempted there has been a failure to secure absolute alinement of the ramming tool in traversing the great length necessary to form a long mold, with the result that the mold is warped or bent and not truly cylindrical throughout, or is crushed or broken down in parts, thereby being rendered unfit for use. Another defect common to machines of this character is that the sand frequently gains access to the bearing surfaces of the working parts of the machine, or the stuffing boxes or glands, and rapidly cuts or wears out said surfaces or parts, and hence quickly destroying the utility of the machine. Again, it is common and desirable to form the molds with socket ends whereby the pipes, when produced are of proper form and shape, and also gates on the spigot ends so that the metal to form the pipes may be readily introduced to the mold. Great difficulty has heretofore been experienced in forming the socket and spigot ends of the molds by reason of the sand requiring special manipulation to form these ends, and the tendency of the mold at or near such ends to be crushed or broken under the manipulations necessary in their formation. Another difficulty experienced in machines of this character is the inability to properly gage and measure the quantity of sand required to form a mold in the machine itself.

It is among the special objects and purposes of my present invention to overcome these and other difficulties and objections in machines of this character, and to produce a simple and efficient machine which, when started up, operates continuously or substantially so, in the production of a complete mold, wherein the mold is absolutely true and of uniform density throughout its entire length; wherein the sand is excluded from the working parts or contacting surfaces, stuffing boxes and glands of the machine; wherein auxiliary patterns for forming the socket and spigot ends of the mold are employed and arranged in coöperative location and arrangement with reference to the other working parts of the machine; wherein means are provided for efficiently guiding a power operated main pattern and in absolute alinement, while performing its work, and which, when it completes its advancing movement, extends throughout and fills the entire length of the mold formed or compressed thereby; wherein the quantity of sand may be readily regulated and measured when supplied to the machine; wherein interruption of the operation of the machine through freezing or frost is prevented; and wherein molds or pipes of varying or differing sizes or diameters may be readily produced on the same machine.

In the accomplishment of these various objects and purposes I employ a containing well or casing C, which, in the form illustrated, comprises cylindrical sections C', which casing contains the power mechanism by which the various patterns are caused to perform their various functions. Within the casing is supported in any suitable or convenient manner, as, for instance, upon a base plate D', a long stationary tubular guide cylinder D, which is open at its upper end and closed at its lower end. This cylinder forms the power cylinder for operating the various patterns, power mediums such as water, steam or compressed air being introduced to the lower end of the cylinder, from any suitable or convenient source through the inlet connection D³. If desired, the base plate D', may be supported upon a flange D² formed in the base of the casing C. Mounted upon, or telescoped over the power cylinder D, and guided thereby is a carrying cylinder E for the main pattern F. The carrying cylinder E, is closed at its upper end, and at its lower end is fitted to the exterior surface of the power cylinder by means of a packing gland, as clearly shown. By the introduction of the power medium to the lower end of the cylinder D, the carrying cylinder is caused to slide vertically upon the power cylinder as a guide, and by opening the lower end of the power cylinder to exhaust the pattern carrying cylinder E, is permitted to slide down the power cylinder to its lowermost or initial position, being aided, if desired, or necessary, by weights O'. Thus the cylinder D, performs the double function of a power cylinder and a stationary guide for the pattern carrying cylinder, and over or upon which said carrying cylinder is telescoped, thereby affording an efficient guide for the carrying cylinder through its entire stroke and insuring accuracy in the alinement of such movement. Especially at the beginning of the stroke of the pattern the power cylinder serves as a guide and that is the time when a true guide is most needed, for the reason that after the pattern has been forced five or six feet into the mold, then the mold itself also forms a guide for the main pattern. Moreover, in the arrangement referred to the bearing surfaces of said cylinders are inclosed and hence protected against access of sand which would rapidly wear such surfaces and destroy the utility of the machine. Moreover, this arrangement enables the power mechanism to be located beneath the flask in which the mold is formed, and beneath the supply of sand to the flask, as will more fully appear hereinafter, and hence permitting gravity to act upon any particles of falling sand to keep the same clear of the moving parts, and this result is also contributed to by locating the stuffing box or gland at the lower end of the carrying cylinder. In its broadest scope, however, my invention is not to be limited or restricted in respect to these details.

The main pattern F, is mounted upon or carried by the carrying cylinder E. This pattern, in the particular embodiment of my invention selected for illustration of the principles involved, comprises a hollow cylinder, open at its lower end and closed at its upper end, and, in use, this cylinder is telescoped over the upper closed end of the carrying cylinder E, and the lower end of the pattern rests upon a suitable flange or projection carried by the carrying cylinder, and by which the pattern is supported and properly centered. The main pattern should be of a length greater than the length of the mold to be formed, and the stroke of the carrying cylinder should be such as to carry the ramming head of the main pattern entirely through the mold. From this it will be seen that since the pattern is absolutely straight and is accurately guided in its movements, the mold is formed absolutely true and straight, and since the spigot and socket patterns are guided to their work by the main pattern every part of the mold is absolutely straight and true. The upper or entering end of the main pattern is preferably curved, beveled or rounded off somewhat spherically to form a ramming head which will enter the mold with facility and be advanced therethrough in the performance of its proper function. In practice, and as shown, I prefer to leave a slight space between the inner wall of the main pattern and the exterior wall of the carrying cylinder and to this space I propose to introduce a heating medium whereby, when in operation, the main pattern may be kept in a heated condition. I have found in practical operation, that this is an important feature in machines of this class as the main pattern, when heated, is enabled to perform its work of ramming, packing and smoothing the surface of the sand in forming the mold with greater facility and better results than when the pattern is forced into and through the mold in the cold.

The heating medium is supplied in any convenient manner, as, for instance, through pipe connection F'. Where steam is employed as the heating medium, any condensation is permitted to drain off through leak holes $F^2$.

In addition to the advantage derived from heating the main pattern so as to present a heated surface to the sand in forming the mold, I am also enabled to avoid the serious objection frequently encountered in sand molding machines and plants, of freezing up the machinery in cold or frigid weather, by the formation of frost on the metal surfaces, and which often necessitates the entire shutting down of the machine or plant.

At or adjacent its lower end, the main pattern is provided with a flange or projection $F^6$, adapted to engage underneath the socket pattern as will presently appear more fully. And at its upper or entering end, a shoulder or seat $F^3$, may be provided upon the main pattern to receive and support the displacing or measuring tube or tool to be referred to more fully hereinafter.

From the construction and arrangement of the main pattern, as above described, and the manner of supporting and operating the same, it will be readily understood that a machine embodying the principles of my invention is readily adapted for use in making differing sizes and lengths of molds without any other change or modification except merely removing the main spigot, and socket patterns together with the socket pattern casing, and substituting other patterns and casing of the proper dimension therefor. The machines are ordinarily designed for the greatest length of molds, and therefore shorter lengths may be formed by employing the proper length of flask and different diameters of molds are formed by substituting the required size of main pattern. This is a valuable feature of my invention as it enables the same machine to form molds for pipes of any desired range of length or size.

I will now describe a construction and arrangement of socket forming pattern embodying the principles of my invention and the manner of mounting and operating the same.

Pipes as usually cast are provided at one end thereof with an enlarged or flared mouth forming a socket to receive the proximate end of the next adjacent pipe section. To form this socket in casting the pipe it is necessary to properly shape the corresponding end of the said mold. Great difficulty has heretofore been experienced in properly shaping the mold for this purpose.

If the socket end of the mold is formed and packed before the mold body, then the body forming pattern when advanced to perform its work will compress the loose sand adjacent the packed or rammed sand of the socket end, lifting the loose sand away from such packed or rammed sand, and leaving an unfilled space or a fault in the mold, thereby impairing the utility of the mold if not completely destroying it. If the pattern which forms the socket is advanced along with the advancing end of the main or body forming pattern until the socket pattern attains its complete advanced or working position, and thereafter the main or body forming pattern continues its advancing movement through the socket pattern, then the same objectionable result and consequences, as above noted, will follow. It has been attempted to form the body of the mold first and then to form the socket end of the mold with a suitable pattern, but this plan has been altogether unsatisfactory in practice for the reason that in such case the danger is incurred of breaking down the formed end of the mold when the socket pattern has been advanced to its working position, and, moreover, difficulties are encountered in properly centering the socket pattern and removing it to permit the removal of the flask with the completed mold, and in failure to secure uniform and homogeneous density throughout the mold. In order to overcome these and other difficulties and objections, I employ a socket forming pattern, separate from the main or body forming pattern, and support the same in proximity to the lower end of the flask, and which, in coöperation with the flask, the measuring tool, the ramming head of the main pattern and the socket pattern support, forms a chamber in which the loose sand is received prior to the molding movements of the main and socket patterns. The socket pattern is in the form of a ring through which the main or body pattern moves. The movement of the main or body pattern, which occurs in advance of the movement of the socket pattern, causes the ramming head of the main pattern to compress that portion of the socket forming sand which surrounds said head so that when the socket pattern is subsequently raised to perform its molding function it lifts and raises the loose sand supported upon its upper end into the space between the inside surface of the enlarged lower end of the flask and the side of the main or body pattern and against the sand immediately above and which has already been rammed or compressed by the ramming head of the main pattern, thereby compressing and ramming the sand to form the socket portion of the mold and the adjacent end of the body of the mold. Describing more in detail my construction and arrangement I employ a socket pattern in the form of a ring G, and arrange the same to encompass or encircle the advancing or entering end of the main pattern, when said main pattern is in its fully retracted position, as clearly shown in the drawings, the socket pattern thereby forming a guide for the main pattern and through which the main pattern operates. The socket pattern is carried by a movable support G', by means of which it may be properly centered and carried into position to be advanced to its work and withdrawn out of the way for the completed mold to be removed. The support G', may be operated in many specifically different ways. In the particular form shown, to which, however, my invention is not to be limited or restricted, the support G' is carried by plungers $G^2$, operating in cylinders $G^3$, to which a motive fluid may be supplied from any suitable or convenient source. In this manner the socket pattern may be centered and moved into or retacted from position to be advanced to its work, and such movement is effected independently of the operation of the main pattern. The socket pattern is advanced to its work from its initial position by, or coincidently with the operation of the main pattern by the flange or projection $F^6$, on the main pattern engaging beneath the socket pattern, as the main pattern approaches the limit of its working stroke, whereby the socket pattern is forced into or against the sand to form the socket thereon, and with the same degree of pressure that is exerted upon the main pattern. From this construction it will be seen that when the socket pattern is advanced to perform its ramming work the ramming action thereof is resisted not only by the rammed sand of the body of the mold, but also by the flask and the main pattern which form supports for the rammed body of the mold and hence the danger is avoided of crushing or breaking down the formed body of the mold when the socket pattern is advanced to its work. And by first advancing the main pattern and afterwards the socket pattern, instead of the reverse of this operation, the danger is avoided of the advancing beveled end of the main pattern lifting the sand away from the rammed socket, leaving a fault in the mold at the point where the socket joins the body of the mold. These are important and valuable features of my invention and result from employing a main pattern which is as long or longer than the mold to be formed, and from the relation and operation of the parts as described.

It is impossible to determine beforehand just how much sand will be required to ram the socket to a required or proper density, and it is difficult, though desirable, to secure the same degree of compression or density of the sand in the socket as in the body of the mold. Any inequalities in the density of the mold at this point results in undue and uneven expansion or contraction of the metal forming the socket of the pipe, and frequently in the injury if not the actual destruction and waste of the mold while being formed or of the pipe when cast. Therefore it is desirable to provide a range of adjustment of the position of the socket pattern relative to its support in order to regulate the amount of sand to be used in forming the socket end of the mold. This result may be accomplished in many specifically different ways. I have shown a simple construction for the purpose, to which, however, I do not desire to be limited or restricted wherein the support G', is provided with a series of holes or openings G⁵, see Fig. 7, to receive therethrough supporting studs or bolts G⁴, upon which the socket pattern rests. By inserting the studs or bolts in the desired holes G⁵, the initial position of the socket pattern relative to its support G', may be regulated and adjusted.

The mold is formed in a flask A, and in the accomplishment of the best results it is important that the flask be mounted, centered and secured in position with the bore thereof in true and accurate alinement with the line of movement of the main pattern. It is also desirable to provide means whereby the flask may be easily handled for placing the same in position, and for removing the same when the mold has been completed. I have shown a simple and efficient construction for accomplishing these objects and purposes, but my invention, in these respects, is not to be limited or restricted to the exact and specific construction and arrangement of the details shown. In the particular form illustrated, the flask A, is carried upon a truck or carriage A', the wheels A², of which, operate upon rails A³. At a point adjacent the receiving and centering position of the flask for use, the rails A³, are provided with movable sections A⁴, carried by plungers A⁵, arranged to operate in cylinders A⁶, to which a motive fluid may be supplied in any suitable or convenient manner, whereby the rail sections A⁴, may be maintained in proper level relation with respect to the rails A³, for the wheels A², of the truck or carriage A', to readily pass onto the said sections A⁴, from the rails A³. By exhausting the motive fluid from cylinders A⁶, the rail sections A⁴, and the truck or carriage A', with the flask supported thereon, are lowered until the carriage A', rests upon the top plate B, of the main casing C, said top plate having openings therethrough, through which the rail sections A⁴, may be thus lowered. In order to center and secure the flask in proper position many specifically different constructions may be employed. I have shown a simple construction for accomplishing this result, but to which I do not desire to be limited or restricted, wherein I employ centering pins A⁷, adapted to be received vertically through lugs A⁸, on carriage or truck A', as said carriage or truck is lowered into working position, as above described. Suitable cotters may be inserted transversely in the projecting ends of pins A⁷, as clearly shown in Fig. 4, to secure and lock the truck or carriage A', in its centered position.

As hereinabove noted, in machines of this class it is desirable to supply to the flask at one time the entire quantity of sand for a mold, in order that the mold forming operation, when the main pattern is once set in motion, may be carried out continuously. It is also desirable to provide a preliminary retaining support for the column of sand supplied to the flask and to regulate and measure the quantity of sand supplied according to the requirements of the mold to be provided. Many specifically different constructions and arrangements for accomplishing these various objects and purposes may be employed. I have shown a simple and efficient construction and arrangement for the purpose, to which, however, I do not desire to be limited or restricted, wherein I employ a displacing or measuring tube H, which, when the flask A, is secured in its centered position, is inserted into the flask, until the lower end thereof is received upon the shoulder or seat F³, in the entering end of the main pattern, thereby being centered at its lower end upon the upper end of the main pattern. The upper end of the displacing tube may be centered in the upper end of the flask in any suitable or convenient manner, as, for instance, by means of a spider ring H', see Figs. 1 and 8, having radiating wings or flanges H². With the flask and displacing tube in their proper positions and the main and socket patterns in their assembled relation ready to be put in operation to form a mold, the sand is introduced into the space between the exterior surface of the displacing tube, and the interior surface of the flask, the column of sand being supported by the main and socket patterns and the flask and movable supporting ring G', the position of the socket pattern in its supporting ring G', serving to regulate the amount of sand to be employed in forming the socket end of the mold, and the displacing tube H, serving to regulate and measure the quantity of sand supplied to the flask to form the mold, while at the same time enabling the entire quantity of sand to form the mold to be supplied to the flask at one time, and hence enabling the mold forming and shaping operation to be carried on uninterruptedly. As the main pattern advances into the sand filled flask to perform its work, the displacing tube is pushed out by the advancing end of said pattern, thereby forming a retaining support for the decreasing length of the loose column of sand in advance of the end of the main pattern, and until the ramming head of the main pattern completes its work of ramming or compressing the sand. When the end of the main pattern has advanced entirely through the flask, and the displacing tube is forced entirely out of the flask, said tube may be removed and supported out of the way, or in convenient position for use in forming the next mold. This may be accomplished in many specifically different ways. I have shown a simple arrangement, to which, however, my invention is not to be limited or restricted, wherein a chain H⁴, is connected at one end of the displacing tube and after passing over an overhead pulley H⁵, has a counter balancing weight H⁶, connected to the other end. By this construction the displacing tube may be readily and conveniently handled, and removed and supported when its work is completed, and while a formed mold is being removed and a fresh flask is being placed in position.

In order to properly shape the upper end of the mold I employ a spigot pattern I. This pattern is supported in any convenient manner in position for use. In the form shown said pattern is supported by chains I', passing over overhead pulleys I², and having counterbalancing weights I³, connected thereto. The displacing tube passes through the bore of the spigot pattern, and when said tube has completed its work and is removed, the spigot pattern is lowered into position to be received, seated and centered upon the end of the main pattern which projects above the upper end of the flask, as shown in Fig. 2, when said main pattern has completed its advancing movement. When the spigot pattern is thus seated and centered upon the end of the main pattern, it is secured thereto in any convenient manner, as, for instance, by means of a locking pin or bolt I⁴. Now, by reversing the direction of travel of the main pattern, and as the main pattern begins its withdrawal movement, the spigot pattern is carried down with it into the upper end of the mold to properly shape such end. When this work is completed the withdrawal movement of the main pattern is interrupted and the spigot pattern is detached from the end thereof and is returned to its retracted position out of the way and ready for the next operation, while the main pattern resumes its withdrawing movement through the mold.

During the advancing movement of the main pattern into and through the mold, the sand is uniformly rammed and compressed throughout the entire length of the mold, the rounded, curved or tapering surface of the advancing end of the main pattern performing the ramming function, and the remaining portion of the exterior surface of the main pattern as it advances longitudinally through the bore of the mold serving as a support for, and, in turn, being supported and guided by the compressed or rammed column of sand, and sleeking or smoothing the surface of the bore of the mold, being greatly aided in this work by reason of the fact that the surface thereof which contacts with the surface of the compressed sand may be heated, as above explained. As the main pattern approaches the limit of its ramming stroke the flange F⁶, on the lower end thereof, engages under the bottom edge of the auxiliary socket pattern thereby raising such socket pattern within its floating or movable supporting ring, and into position to effect the proper shaping of the socket end of the mold. As the advancing end of the main pattern is finally carried beyond the end of the flask, the displacing tube is removed, the spigot pattern is lowered into position and secured on the protruding end of the main pattern, and the movement of the main pattern reversed to withdraw the same back through the formed mold. When the withdrawal movement of said pattern proceeds to the desired extent for the spigot pattern to perform its work of shaping the upper end of the mold, said spigot pattern is released from the main pattern and the latter continues its withdrawal movement through the mold, and in so doing serves to iron and smooth the surface of the bore of the mold, thereby removing any roughness in such surface. After the main pattern is wholly withdrawn the socket pattern and its casing are lowered, the flask truck or carriage raised and the flask containing the completed mold removed. A new flask is then placed in position and the various operations are repeated. The mold produced as above described is machine made throughout and by reason of the construction described is absolutely accurate, true and homogeneous throughout, and the various operations necessary to make a complete mold are accomplished quickly and rapidly, enabling a machine to have a very large daily capacity; and as there are no delicate parts to be broken or to get out of repair, and as sand particles are prevented from gaining access to the working parts of the power mechanism, the machine will stand long and hard usage before it requires repair. By the vertical or upright arrangement of the machine, as shown, the sand for forming the mold may be delivered from a point above the mold forming mechanism. It will also be seen that by locating the power cylinder below the operative position of the flask, said cylinder may be so extended in length that its upper end may be in comparatively close proximity to the lower end of the flask, and since this cylinder is held stationary, it serves as an efficient guide for the carrying cylinder and main pattern to maintain the line of movement thereof true and accurate.

In Fig. 9, I have indicated a conveniently arranged molding plant, reference sign J designating a pressure mechanism for the operating fluid supplied to the machine, and P, a drying device to which the flasks containing finished molds may be delivered after the mold forming operation is completed. After the molds have been cast and sufficiently cooled, the pipes are removed and the sand falls into a conveyer K', by which it is delivered to a mill L, where it is mixed with fresh sand and water, and from which it is elevated by a conveyer M, to a screen N, and thence is discharged into a hopper O, ready for use when a flask is again positioned below the delivery spout of such hopper. As fast as the molds are made they are rolled away and sprayed with graphite or ground coal, as at P', and are then dried in ovens indicated at P. The cores are then inserted and they are ready for casting.

I have referred to the end of the main pattern as being tapered, beveled or curved, in order to facilitate the ramming operation, and when I refer to the end of the main pattern as being tapered I desire to include thereby not only a taper but any form of bevel or curve which accomplishes the desired results.

It is believed that the operation of the machine will be fully and clearly understood from the foregoing description taken in connection with the accompanying drawings.

Many variations and changes in the details of construction and arrangement of parts of the machine might readily occur to persons skilled in the art and still fall within the scope of my invention. I do not desire, therefore, to be limited or restricted to the exact and specific details shown and described; but Having now set forth the object and nature of my invention and a construction embodying the principles thereof, and having explained such construction, its purposes and mode of operation, what I claim as new and useful, and of my own invention, and desire to secure by Letters Patent is:—

1. In a molding machine, a power cylinder, a carrying cylinder telescoped thereover, a pattern carried by said carrying cylinder, a flask, and means for admitting power medium to said power cylinder to operate said carrying cylinder.

2. In a molding machine, a power cylinder, a pattern telescoped over said cylinder, a flask, means for supporting the same in line with said pattern, and means for admitting power medium to said cylinder to move said pattern through the flask.

3. In a molding machine, a stationary power cylinder, open at one end, a pattern telescoped over the open end of said cylinder, a flask, means for supporting said flask in line with said pattern and means for admitting power medium to said cylinder to move said pattern into said flask.

4. In a molding machine, a stationary power cylinder, open at one end, a carrying cylinder telescoped over the open end of said power cylinder, a pattern carried by said carrying cylinder, a flask, means for supporting said flask in line with said pattern, and means for admitting power medium to said power cylinder.

5. In a molding machine, a power cylinder open at one end, a carrying cylinder telescoped over the open end of said power cylinder, a pattern telescoped over the carrying cylinder, a flask, means for supporting the same in line with said pattern, and means for admitting power medium to the power cylinder.

6. In a molding machine, a stationary power cylinder, open at one end, a carrying cylinder also open at one end and sleeved over said power cylinder, and provided with a support, a pattern sleeved over said carrying cylinder and resting on said support, a flask arranged in line with the pattern, and means for admitting power medium to the power cylinder.

7. In a molding machine, a power cylinder, a flask, arranged above and in line with said cylinder, a pattern, telescoped over the upper end of said cylinder, and means for supplying a power medium to said cylinder.

8. In a molding machine, a power cylinder, a flask, means for centering and supporting the flask above and in alinement with said cylinder, a pattern removably telescoped over the upper end of said cylinder, and means for admitting power medium to said cylinder.

9. In a molding machine, a power cylinder, a flask, means for supporting and securing the flask in alinement with the power cylinder, a pattern telescoped over the end of the power cylinder, means for supplying a heating medium to the interior of the pattern, and means for supplying a power medium to said cylinder.

10. In a molding machine, a stationary power cylinder, open at one end, a flask, means for supporting and securing said flask in alinement with said cylinder, a carrying cylinder telescoped over the open end of said power cylinder, a pattern sleeved over said carrying cylinder, means for supplying a heating medium to the space between the pattern and the carrying cylinder and means for supplying a power medium to the power cylinder.

11. In a molding machine, a power cylinder open at one end, a flask, means for supporting and securing said flask in alinement with said cylinder, a pattern sleeved over the open end of said cylinder, and having a tapering closed end, and means for admitting power medium to said cylinder.

12. In a molding machine, a power cylinder open at one end, a flask, means for supporting and securing said flask in alinement with said cylinder, a pattern of greater length than the length of the flask, and having a tapering closed end, said pattern being sleeved over the open end of the power piston and means for admitting power medium to said cylinder.

13. In a molding machine, a main pattern, a flask, means for securing the same in alinement with the main pattern, and power mechanism for advancing the pattern into and withdrawing the same from the flask, in combination with an auxiliary socket pattern, arranged between the flask and the main pattern, and through which the main pattern operates, and means independent of the power mechanism for advancing the socket pattern to its work.

14. In a molding machine, the combination with a flask and a main pattern, of a socket pattern through which the main pattern operates, a support for the socket pattern, means for advancing the socket pattern support towards the flask, and means for adjusting the position of the socket pattern in its support, towards and from the flask.

15. In a molding machine, the combination with a flask and a main pattern, of a socket pattern through which the main pattern operates, a ring arranged to inclose and support the socket pattern, means for advancing the ring towards the flask, and means for adjusting the socket pattern towards and from the flask and within the ring.

16. In a molding machine, the combination with a flask and a main pattern, of a socket pattern through which the main pattern operates, a supporting ring inclosing the socket pattern, and adjustable bolts or studs carried upon said ring and upon which said pattern rests.

17. In a molding machine, the combination with a flask and a main pattern, of a socket pattern through which the main pattern operates, a ring in which said socket pattern is adjustably supported and inclosed power mechanism for moving said ring to carry said socket pattern towards and from the flask, and power mechanism for actuating the main pattern.

18. In a molding machine, a main pattern having a projection, a flask, means for securing the flask in alinement with the main pattern, and mechanism for operating the main pattern, in combination with a socket pattern, a support therefor, means for moving said support to advance the socket pattern to its work, the projection on the main pattern arranged to engage the socket pattern and force the same into its working position as the main pattern completes its work.

19. In a molding machine, a flask, means for supporting the same, a socket pattern arranged below the flask supporting means, a supporting ring therefor, a main pattern, means located below the socket pattern and flask for advancing the main pattern through the socket pattern and into the flask, and withdrawing the same, and means for maintaining the socket pattern in its working position during the withdrawal movement of the main pattern.

20. In a molding machine, a socket pattern, a supporting ring in which said pattern is movably supported, plungers carried by said ring, cylinders in which said plungers operate and adapted to receive an operating medium.

21. In a molding machine, a flask, a pattern and means for advancing said pattern into and withdrawing the same from said flask, in combination with a measuring tube adapted to be supported and centered upon the end of the pattern, and to be moved thereby, and means for centering said measuring tube within the flask.

22. In a molding machine, a flask, a pattern having a seat formed on the end thereof, and means for advancing said pattern into and withdrawing the same from said flask, in combination with a measuring tube centered at one end upon the seat in the end of the pattern, and a spider for centering the other end of said tube in the flask.

23. In a molding machine, a flask, a pattern, and means for advancing said pattern into and withdrawing the same from said flask, in combination with a measuring tube, adapted to be inserted through the flask and to be centered therein upon the end of the pattern, and means for suspending said tube.

24. In a molding machine, a flask, a pattern, and means for advancing said pattern into and withdrawing the same from said flask, in combination with a measuring tube, adapted to be inserted through the flask and to be centered therein, and a counterbalancing means for suspending said tube.

25. In a molding machine, a flask, a power cylinder arranged in line therewith, a main pattern of greater length than the flask and sleeved over the end of the cylinder and means for moving said pattern along the cylinder, in combination with a spigot pattern and means for detachably securing the spigot pattern to the end of the main pattern.

26. In a molding machine, a flask, a spigot pattern, means for supporting the same over said flask, a main pattern arranged below the flask, and of greater length than the flask, means for advancing said main pattern through the flask whereby said spigot pattern may be received on the protruding end thereof, and means for detachably securing the spigot pattern upon the end of the main pattern.

27. In a molding machine, a flask, a main pattern, and means for moving the same throughout the flask, in combination with a measuring tube adapted to be received on the end of the main pattern and to be forced out of the flask as the main pattern advances therethrough, a spigot pattern through which said measuring tube passes, whereby, when the end of the main pattern emerges from the flask, the spigot pattern may be received thereon, and means for detachably securing the spigot pattern in place upon the end of the main pattern.

28. In a molding machine, a flask, a main pattern and means for advancing the said pattern into and withdrawing the same from said flask in combination with a spigot pattern, and means for supporting the same above the flask in position to be received on the end of the main pattern when it emerges from the flask, and means for securing the spigot pattern to the main pattern.

29. In a molding machine, a flask, a main pattern, and means for advancing the pattern into and withdrawing same from said flask, in combination with a spigot pattern and counterbalancing means for supporting said spigot pattern in position to be received on the end of the main pattern when the latter advances through the flask.

30. In a molding machine, a flask, a pattern, a carrying cylinder over which the pattern is sleeved, and means for moving the carrying cylinder to force the pattern into the flask.

31. In a molding machine, a flask, a carrying truck therefor, a main pattern, a seat for said truck arranged in centered relation with respect to the pattern, and means for lowering and securing the truck and flask in said seat.

32. In a molding machine, a flask and a pattern arranged in line with each other, said pattern having a tapering end, a measuring tube, means for suspending the same above the flask and in position to be inserted through the flask, to be received and centered upon the tapering end of the pattern, and means for forcing the pattern into the flask.

33. In a molding machine, a flask and a pattern arranged in alinement with each other, said pattern having its advancing end tapered, a measuring tube, means for suspending the same above the flask and in position to be inserted through the flask to be received at one end and centered upon the tapered end of the pattern, removable means for centering the other end of said tube within the flask, and means for forcing the pattern into the flask.

34. In a molding machine, a flask, a main pattern supported below said flask and in line therewith, an auxiliary socket pattern also arranged below the flask, and surrounding the main pattern, an independent support for said auxiliary pattern, the main and auxiliary patterns and the auxiliary pattern support closing the bottom of the flask while the sand is being supplied thereto, means for adjusting the position of the auxiliary pattern within its support to regulate the quantity of sand to be supplied, and means for operating the main and auxiliary patterns.

35. In a molding machine, a flask, a main pattern arranged in line therewith, an auxiliary pattern surrounding the main pattern, a support for the auxiliary pattern independent of the main pattern and its support, means for advancing the patterns to their work, and means for withdrawing the main and auxiliary patterns, and the auxiliary pattern support from the flask to permit the removal of the flask.

36. In a molding machine, a flask, a truck upon which the flask is carried, a main pattern, rails upon which the truck operates, said rails having movable sections adjacent to said pattern, means for lowering said rail sections and truck, to move the flask towards the pattern and in centered relation thereto, means for securing the flask in its centered position, and means for forcing the pattern into the flask.

37. In a molding machine, a pattern, a carrying cylinder for said pattern, a power cylinder over which said carrying cylinder is sleeved, means for supplying power medium to said power cylinder, a casing in which said cylinders are mounted, a top plate for said casing provided with an opening through which the pattern is adapted to be moved, track rails mounted on said top plate, and having movable sections on each side of said opening, a flask mounted on wheels adapted to operate on said rails, and lifting and lowering mechanism for said rail sections, whereby the flask and wheels may be lowered when in centered relation with respect to the pattern.

38. In a molding machine, a casing, a stationary cylinder centrally arranged therein, a main pattern sleeved over said cylinder, a top for said casing having an opening through which said pattern may be moved endwise, an auxiliary pattern, surrounding the main pattern and through which the main pattern moves, an independent support for the auxiliary pattern, a flask, means for centering the same in line with the opening in the casing top, a measuring tube adapted to be inserted through the flask and to rest upon the end of the main pattern, means for centering the tube in the flask, a spigot pattern arranged above the flask and in position for the measuring tube to pass therethrough, whereby said spigot pattern may be received upon the end of the main pattern when it emerges through the flask, means for detachably securing said spigot pattern to the end of the main pattern, and means for supplying operating medium to said cylinder.

39. In a molding machine, the combination of a flask, a main pattern, a socket pattern and a measuring tube, said main pattern being of greater length than the flask and operating through the socket pattern, the measuring tube being received and centered at one end upon the end of the main pattern, means for centering the other end of said tube within the flask, and means for operating the main and socket patterns.

40. In a molding machine, a main casing, a main pattern, a flask supported upon the main casing in line with the main pattern, the main pattern being of greater length than the flask, an auxiliary casing, a socket pattern carried thereby, and power mechanism for operating the main and socket patterns.

41. In a machine for forming sand molds, a flask, a main pattern, and means for advancing the same to its work, in combination with a socket pattern, a support in which the socket pattern is movably supported, and means for adjusting the initial position of said socket pattern in its support.

42. In a machine for forming sand molds, a flask, a main pattern, and means for advancing the same to its work, in combination with a socket pattern, an inclosing ring therefor, said ring having openings therethrough, and removable pins adapted to be received in said openings and forming supports for said socket pattern.

43. In a molding machine, the combination of a flask, a main pattern, a socket pattern, and a measuring tube, said main pattern operating through the socket pattern, the measuring tube being centered at one end by the end of the main pattern, means for centering the other end of said tube within the flask, and means for moving the main and socket patterns to their work.

44. In a molding machine, the combination of a flask, a main pattern, a socket pattern, a measuring tube, and a supporting casing for the socket pattern, means for moving the main pattern longitudinally through the socket pattern and it supporting casing, the measuring tube being centered at one end by the end of the main pattern and means for centering the other end of said tube within the flask.

45. In a molding machine, the combination of a flask, a main pattern, a socket pattern, and a spigot pattern, the main pattern being of greater length than the flask and operating longitudinally through the socket pattern and flask, a measuring tube centered at one end by the end of the main pattern, means for centering the other end of said tube within the flask, said spigot pattern adapted to be received upon the advancing end of the main pattern when it emerges from the flask, and means for moving the main and socket patterns to their work.

46. In a molding machine, a main pattern having a ramming head at the upper end thereof, a flask supported in line with and over the main pattern, the main pattern being of greater length than the flask, a socket pattern at the lower end of the flask and through which the main pattern operates, a displacing tube supported by the upper end of the main pattern, and power mechanism for operating the main and socket patterns.

47. In a molding machine, a main pattern, and a flask, in combination with a socket pattern, means for moving the same into position to perform its work of forming and compressing the socket end of the mold, and means for adjusting the initial position of said socket pattern relative to its moving means.

FRED HERBERT.

Witnesses:
  J. DINSDALE,
  T. BELL.